3,766,166
PROCESS FOR OBTAINING WATER-SOLUBLE AESCIN FROM DRY HORSE CHESTNUT SEEDS EXTRACTS

Hans Georg Menssen, Geyen, and Hans Honerlagen, Frankfurt-Praunheim, Germany, assignors to A. Nattermann & Cie GmbH, Braunfeld, Germany
No Drawing. Continuation-in-part of abandoned application Ser. No. 816,410, Apr. 15, 1969. This application Mar. 6, 1972, Ser. No. 232,276
Claims priority, application Austria, Apr. 17, 1968, 3,761/68
Int. Cl. A61k 27/14
U.S. Cl. 260—210.5                                 5 Claims

ABSTRACT OF THE DISCLOSURE

Water soluble pure aescin having a melting point of 218° C. is obtained by dissolving a dry extract of horse chestnut seeds in a single phase mixture of n-propanol, ethyl acetate and water which is cold-saturated with borax, then bringing the solution into contact with acid activated aluminium oxide, and then fractionally eluting with a solvent mixture of n-propanol, ethyl acetate and water.

---

This application is a continuation-in-part of co-pending application Ser. No. 816,410 filed Apr. 15, 1969, now abandoned.

This invention relates to an improved process for the recovery of aescin in a water soluble state from dry extracts of horse chestnut seeds.

The medicinal effect of horse chestnut seeds and their extracts is known to be due mainly to the aescin contained in them. Total extracts of this drug are employed mainly for oral administration, while for parenteral application, the isolated active substance often affords valuable advantages.

The aescin content of horse chestnut seeds is about 5–6 percent. A number of processes have been disclosed for obtaining dry extracts from horse chestnut seeds. Several known processes yield between about 15% and about 20%. Additional processes have been described which yield dry extracts containing as high as 49% aescin content as more particularly disclosed by applicants in their U.S. application Ser. No. 827,141 filed May 23, 1969 which was co-pending with the parent application and which has now matured as U.S. Pat. 3,609,137.

The present invention can be practiced starting with any of these dry extracts of horse chestnut seeds.

It is known to separate aescin by mild acid hydrolysis from an extract obtained from horse chestnuts. In addition, it is known from German Auslegeschrift No. 1,044,359 to precipitate the saponins from horse chestnut extracts by means of barium hydroxide. The production of horse chestnut saponins as insoluble saponin-sterol addition compounds with the aid of cholesterol by various processes has been described in Swiss patent specification No. 410,283 and German Auslegeschrift No. 1,045,597. In addition, it is known from German Auslegeschrift Nos. 1,095,989, corresponding to U.S. Pat. 3,238,190, and 1,125,117, corresponding to U.S. Pat. 3,110,711 to produce aescin from horse chestnut extracts with the aid of ion exchangers. A yield of 2% calculated on the starting material was obtained in U.S. Pat. 3,238,190. In these known methods, the yield has been unsatisfactory. Moreover, it has been found that the aescin isolated by these procedures is relatively sparingly soluble in water, which renders difficult further processing and formulation for medicinal use as injectable solutions.

It has now been found that the problem of producing water-soluble pure aescin can surprisingly be solved without any precipitation reactions or other complex procedures if, in accordance with the present invention, the dry extract obtained from horse chestnut seeds which can be prepared by various known methods is dissolved in a single phase mixture of n-propanol, ethyl acetate and water, preferably present in substantially equal proportions by volume, and cold-saturated with borax; the resulting solution is brought into contact with an acid activated aluminium oxide; and is then subjected to fractional elution with a single phase solvent mixture of n-propanol, ethyl acetate and water.

In the elution from alumina, the slightly yellow-colored and substantially aescin-free first runnings are discarded and only the colorless eluate thereafter obtained is collected. This aescin-containing eluate may be freed from the solvent mixture, preferably in vacuo, to leave a slightly yellowish amorphous powder. The residue is advantageously washed a number of times with pure acetone to give pure, white and surprisingly readily water-soluble aescin having a melting point of 218° C.

The proportions in which the propanol, ethyl acetate and water are mixed affects the dissolving power of the solvent mixture saturated with borax in the dissolution of the dry extract of the horse chestnut. If the water is lacking or if the water or the ethyl acetate is present in a substantially smaller quantity than propanol, the extract does not dissolve satisfactorily as two solvent phases are formed, one of which has an oily to greasy consistency, and therefore these solutions cannot be used for chromatography on aluminium oxide.

The mixing ratio is also particularly important in the elution of the aescin adsorbed on the aluminium oxide. Here again, a solvent mixture in which the three components are present in substantially equal proportions by volume can be employed, but the best yields are obtained when n-propanol is the major component by volume. The n-propanol:ethyl acetate:water volume ratio is therefore preferably 4:3:3. Very good results are also obtained with a ratio of 5:4:4. However, if the n-propanol content rises to give a ratio as high as 6:3:3, the yield of pure aescin appreciably decreases, or the separation from the accompanying substances is impaired. Thus the mixing ratio by volume can be 33⅓–40% n-propanol:30–33⅓% ethyl acetate:30–33⅓% water. The acid activated aluminium oxide used in the process may be of the grade generally used in column chromatography. The activated aluminium oxide may be a fired aluminium oxide treated with hydrochloric acid or an activated acidic aluminium oxide with an activity degree 1.

In the parent application applicants disclosed that dry extracts obtained from horse chestnut seeds could be utilized regardless of the method of preparation so that those skilled in the art could follow the original disclosure. This was confirmed by taking various known commercially available dry extracts of horse chestnut seeds, identified by the manufacture and with its aescin content and testing them according to the process of the present invention to obtain the results as disclosed in the parent application.

The following examples will illustrate this, but are not meant to limit the process of the invention:

EXAMPLE 1

10 g. of horse chestnut dry extract having an aescin content of 31% made by the firm Nattermann is dissolved in 50 ml. of a mixture of n-propanol, ethyl acetate and water in proportions of 4:3:3, the said mixture being cold-saturated with borax. The solution is worked up into a paste with 80 g. of acid activated aluminium oxide and compactly charged into a glass column 600 mm. long and about 62 mm. in diameter, which has previously been charged with 800 g. of the same aluminium oxide, to avoid the formation of cavities. The product is then eluted with 2.5 lit. of the same mixture of n-propanol, ethyl acetate and water in a ratio of 4:3:3. The first 200 ml. of the eluate run off are slightly yellowish and substantially free from aescin and are discarded. The next 1.8 lit. of eluate obtained contains only aescin and this fraction is carefully dried in vacuo at 30° C. to remove the solvents and given a slightly yellowish powder, which is washed several times with acetone and then dried in air.

1.0 g. of white, amorphous, water-soluble aescin is obtained having a melting point of 218° C. This pure aescin is substantially insoluble in ether, acetone and chlorinated hydrocarbons, but is soluble in lower alcohols as well as in water, but sparingly soluble in higher alcohols.

The yield is 32.2% of theory.

EXAMPLE 2

10 g. of dry horse chestnut extract of the firm Finzelberg in Andernach (Federal Republic of Germany) having an aescin content of 20% is dissolved in 50 ml. of a mixture of n-propanol, ethyl acetate and water in a ratio of 4:3:3, said mixture being cold-saturated with borax. The solution is worked up into a paste with 80 g. of acid activated aluminium oxide and is compactly charged into a glass column 600 mm. long and about 62 mm. diameter, which has previously been charged with 800 g. of the same aluminium oxide to avoid the formation of cavities. The product is then eluted with 2.5 l. of the same mixture of n-propanol, ethyl acetate and water in a ratio of 4:3:3. The first 200 ml. of the eluate run off are slightly yellowish, are substantially free from aescin and are discarded. The eluate then obtained contains only aescin up to an amount of 1.8 l. This fraction (1.8 l.) is concentrated under careful conditions in vacuo at 30° C. until it is dry. What remains is a slightly yellowish powder which is washed several times with acetone and then dried in air.

0.7 g. white, amorphous, water-soluble aescin is obtained having its melting point at 218° C. This pure aescin is substantially insoluble in ether, acetone and chlorinated hydrocarbons; but is very easily soluble in water and in methanol or ethanol.

The yield is 35% of theory.

EXAMPLE 3

10 g. of dry horse chestnut extract of the firm Birkenweg of Frankfurt, Germany having an aescin content of 22% is dissolved in 50 ml. of a mixture of n-propanol, ethyl acetate and water in a ratio of 4:3:3 said mixture being cold-saturated with borax. The solution is worked up into a paste with 80 g. of acid activated aluminium oxide and is compactly charged into a glass column 600 mm. long and about 62 mm. diameter, which has previously been charged with 800 g. of the same aluminium oxide to avoid the formation of cavities. The product is then eluted with 2.5 l. of the same mixture of n-propanol, ethyl acetate and water in a ratio of 4:3:3. The first 200 ml. of the eluate run off are slightly yellowish, are substantially free from aescin and are discarded. The eluate then obtained contains only aescin up to an amount of 1.8 l. This fraction (1.8 l.) is concentrated under careful conditions in vacuo at 30° C. until it is dry. What remains is a slightly yellowish powder which is washed several times with acetone and then dried in air.

One obtains 0.72 g. of white, amorphous, water-soluble aescin having its melting point at 218° C. This pure aescin is substantially insoluble in ether, acetone and chlorinated hydrocarbons; but is soluble in water and lower alcohols; however, soluble with difficulty in higher alcohols.

The yield is 32.1% of theory.

EXAMPLE 4

A further confirmation that known dry extracts of horse chestnut seeds can be used and results obtained in accordance with the disclosure of the parent application is borne out by the following example utilizing a dry extract of American manufacture.

10 g. of horse chestnut dry extract of the firm Penick & Co. of New York, having an aescin content of 18.5% is dissolved in 50 ml. of a mixture of n-propanol-ethyl acetate-water in proportions of 4:3:3, the said mixture being cold-saturated with borax. The solution is worked up into a paste with 80 g. of activated acidic aluminium oxide and compactly charged into a glass column 600 mm. long and about 62 mm. in diameter, which has previously been charged with 800 g. of the same aluminium oxide, to avoid the formation of cavities. The product is then eluted with 2.5 lit. of the same mixture of n-propanol-ethyl acetate-water in a ratio of 4:3:3. The first 200 ml. of the eluate running off are slightly yellowish and substantially free from aescin and are discarded. The next 1.8 lit. of eluate obtained contains only aescin. This fraction (1.8 l.) is carefully evaporated to dryness in vacuo at 30° C. There remains a slightly yellowish powder which is washed several times with acetone and then dried in air.

0.25 g. of white, amorphous, water-soluble aescin is obtained having a melting point of 218° C. This pure aescin is substantially insoluble in ether, acetone and chlorinated hydrocarbons, is soluble in lower alcohols, but sparingly soluble in higher alcohols. The yield is 13.51%.

In a like manner, experiments were conducted with the dry extracts of horse chestnut seeds, of the following firms:

(a) Chem. Fabrik, Reisholz GmbH, Dusseldorf, Germany
(b) Gerlicher KG, Munich, Germany
(c) Haidlemayer, Stuttgart, Germany The ratio of the ingredients of the mixture were tested with a ratio of 5 parts n-propanol:4 parts ethyl acetate: 4 parts water and also with a ratio of equal proportions of the ingredients.

The results obtained were comparable to the results described in the above examples.

Thus, it has been found that according to the process of the present invention utilizing any of the commercially available dry extracts of horse chestnut seeds, much better yields of pure aescin have been obtained than in the prior processes and further that the aescin isolated was soluble in lower alcohols as well as in water.

It will be obvious to those skilled in the art that various changes may be made without departing from the scope of the invention and the invention is not to be considered limited to what is described in the specification.

What is claimed is:

1. A process for obtaining pure water-soluble aescin from dry extracts of horse chestnut seeds by chromatographic adsorption and elution which comprises dissolving the extract in a mixture of n-propanol:ethylacetate: water having a volume ratio of 33⅓–40%:30–33⅓%: 30–33⅓%, which has been saturated in the cold with borax; bringing the solution of the extract into contact with an acid activated aluminium oxide; and fractionally eluting the aescin from the alumina with a solvent mixture of n-propanol:ethyl acetate:water, having a volume ratio of 33⅓–40%:30–33⅓:30–33⅓, removing the clear aescin-containing elute fraction from the solvent by drying and washing the residue with acetone.

2. A process according to claim 1 in which the solvent mixture used to dissolve the extract contains substantially equal volumes of n-propanol, ethyl acetate and water.

3. A process according to claim 1 in which the solvent mixture used to elute the aescin from the alumina has an n-propanol:ethyl acetate:water volume ratio of about 4:3:3.

4. A process according to claim 1 in which the solvent mixture used to elute the aescin from the alumina has an n-propanol:ethyl acetate:water volume ratio of about 5:4:4.

5. A process according to claim 1 in which the solvent is removed from the elute fraction in vacuo to give a residue of aescin.

References Cited
UNITED STATES PATENTS

| | | | |
|---|---|---|---|
| 2,790,793 | 4/1957 | Boedecker | 260—210.5 |
| 3,163,636 | 12/1964 | Wagner et al. | 260—210.5 |
| 3,170,916 | 2/1965 | Dziengel | 424—182 X |
| 3,238,190 | 3/1966 | Erbring | 260—210.5 |
| 3,110,711 | 11/1963 | Wagner et al. | 260—210.5 |

OTHER REFERENCES

Chemical Abstracts (1) 57:2331e.
Chemical Abstracts (2) 62:5499a.
Chemical Abstracts (3) 60:10475a.
Chemical Abstracts (4) 63:5446a.

ALBERT T. MEYERS, Primary Examiner

N. A. DREZIN, Assistant Examiner

U.S. Cl. X.R.

424—195